United States Patent
Miyashita

(10) Patent No.: US 9,361,577 B2
(45) Date of Patent: Jun. 7, 2016

(54) PROCESSING DEVICE AND COMPUTATION DEVICE

(71) Applicant: Kabushiki Kaisha Toshiba, Minato-Ku, Tokyo (JP)

(72) Inventor: Daisuke Miyashita, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 312 days.

(21) Appl. No.: 14/176,490

(22) Filed: Feb. 10, 2014

(65) Prior Publication Data

US 2015/0074028 A1  Mar. 12, 2015

(30) Foreign Application Priority Data

Sep. 9, 2013 (JP) .................. 2013-186626

(51) Int. Cl.
*G06N 3/04* (2006.01)
*G06N 3/063* (2006.01)

(52) U.S. Cl.
CPC ............ *G06N 3/0635* (2013.01); *G06N 3/0481* (2013.01)

(58) Field of Classification Search
CPC ....................................................... G06N 3/04
See application file for complete search history.

(56) References Cited

U.S. PATENT DOCUMENTS

| | | | |
|---|---|---|---|
| 6,148,101 A | 11/2000 | Tanaka et al. | |
| 7,548,894 B2 | 6/2009 | Fuji | |
| 8,988,262 B2 | 3/2015 | Miyashita | |
| 2006/0294034 A1 | 12/2006 | Fuji | |
| 2011/0004579 A1 | 1/2011 | Snider | |
| 2013/0254632 A1 | 9/2013 | Miyashita | |
| 2015/0035690 A1 | 2/2015 | Miyashita | |

FOREIGN PATENT DOCUMENTS

| | | |
|---|---|---|
| JP | 09-212477 A | 8/1997 |
| JP | 2004-252943 A | 9/2004 |
| JP | 2007-004514 A | 1/2007 |
| JP | 5155843 B2 | 7/2010 |
| JP | 5154666 B2 | 2/2013 |
| JP | 2013-160418 A | 8/2013 |
| JP | 2013-198052 A | 9/2013 |
| JP | 2015-032950 A | 2/2015 |

*Primary Examiner* — Kakali Chaki
*Assistant Examiner* — Vincent Gonzales
(74) *Attorney, Agent, or Firm* — White & Case LLP

(57) ABSTRACT

According to one embodiment, a processing device is configured to process input data formed of a plurality of input digital values. The processing device has a plurality of computation layers connected in series. Each of the computation layers has a plurality of computation devices. Each of the plurality of computation devices in the computation layer of a first stage is configured to generate a digital value from the input digital values and weight coefficients defined in advance. The weight coefficients are applied to each of the input digital values. Each of the plurality of computation devices of the computation layer of a second or subsequent stage is configured to generate a new digital value from the digital values generated by the computation devices of the computation layer of the previous stage and weight coefficients defined in advance. The weight coefficients are applied to each of the digital values.

20 Claims, 13 Drawing Sheets

32

32'

PROCESSING DEVICE AND COMPUTATION DEVICE

CROSS REFERENCE TO RELATED APPLICATIONS

This application is based upon and claims the benefit of priority from the prior Japanese Patent Application No. 2013-186626, filed on Sep. 9, 2013, the entire contents of which are incorporated herein by reference.

FIELD

Embodiments described herein relate generally to a processing device and a computation device.

BACKGROUND

A neural network is a model devised by imitating neurons and synapses in the brain, and is constituted by processing in two stages including learning and recognition. In the learning stage, features are learned from many inputs to establish a neural network for recognition processing. In the recognition stage, it is recognized what the new input is using the neural network.

In recent years, great progress has been made in the technique of a learning stage, and for example, a multi layer neural network having a high degree of expressing ability can be structured by deep learning.

On the other hand, when the processing in the recognition stage is implemented with software, it could take a lot of time in the processing and lead to higher power consumption. Accordingly, the processing in the recognition stage may be performed with hardware. However, in the multi layer neural network, there are many parameters and much computation, and therefore, the hardware configuration may become complicated.

DETAILED DESCRIPTION

In general, according to one embodiment, a recognition device is configured to recognize input data formed of a plurality of input digital values. The recognition device has a plurality of computation layers connected in series. Each of the computation layers has a plurality of computation devices.

Each of the plurality of computation devices in the computation layer of a first stage is configured to generate a digital value from the input digital values and weight coefficients defined in advance. The weight coefficients are applied to each of the input digital values.

Each of the plurality of computation devices of the computation layer of a second or subsequent stage is configured to generate a new digital value from the digital values generated by the computation devices of the computation layer of the previous stage and weight coefficients defined in advance. The weight coefficients are applied to each of the digital values.

The digital values generated by the computation devices of the computation layer of a final stage indicate a recognition result.

At least one of the computation devices has a plurality of digital-to-time conversion circuits connected in series, and a time-to-digital conversion circuit. Each of the plurality of digital-to-time conversion circuits generates a second time signal by delaying a first time signal by a time corresponding to an inputted digital value and the weight coefficient corresponding to the digital value. The second time signal is inputted into the digital-to-time conversion circuit of a subsequent stage as the first time signal. The time-to-digital conversion circuit is configured to generate a digital signal by comparing the second time signal outputted from the digital-to-time conversion circuit of the final stage and a first time threshold signal.

Hereinafter, embodiments of the invention will be described in details with reference to drawings.

In the present embodiment, a recognition system using a neural network is assumed. In this recognition system, a neural network (described later) is firstly established in a learning stage. After the neural network is established, recognition can be made as to what a new input is using this neural network in the recognition stage. In the description below, for example, a recognition system will be described, where an input is an image in which any one of one-digit numerals 0 to 9 is drawn, and the recognition system recognizes which one of the numerals is drawn.

Figure 1:
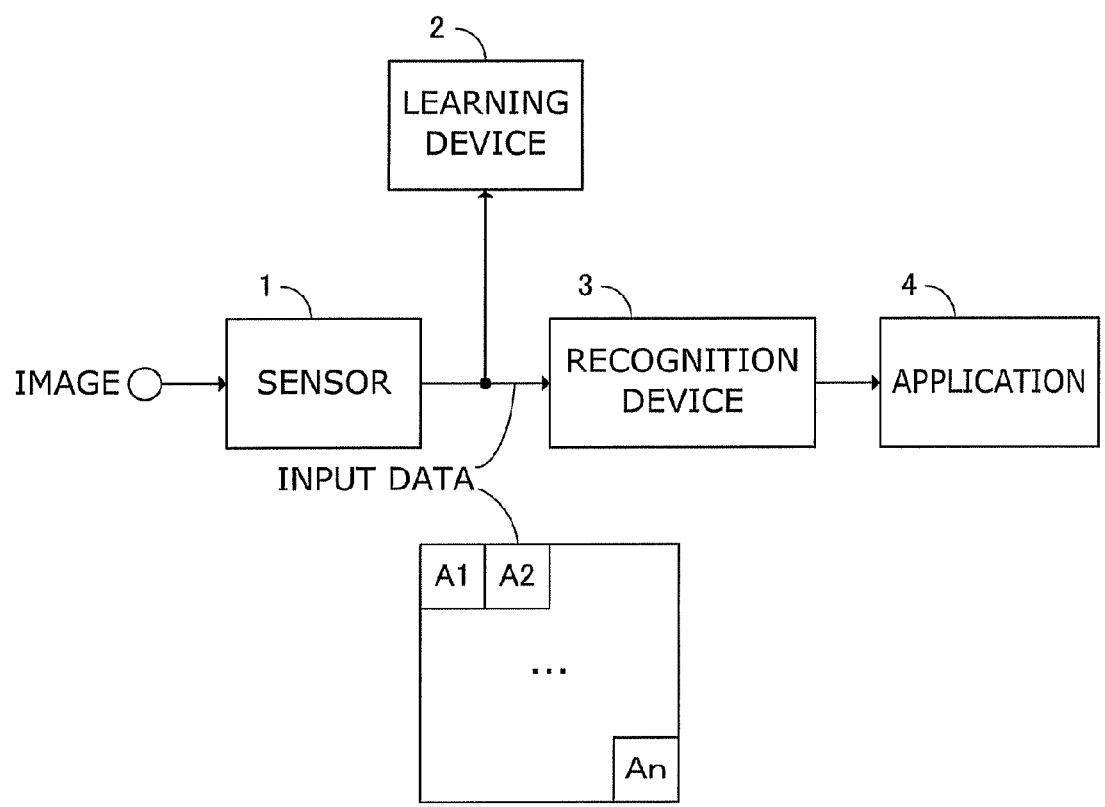
FIG. 1 is a block diagram illustrating a schematic configuration of a recognition system.

FIG. 1 is a block diagram illustrating a schematic configuration of a recognition system. The recognition system includes a sensor 1, a learning device 2, a recognition device (processing device) 3, and an application (app) 4.

For example, the sensor 1 is an image sensor, and generates input data corresponding to the image from the image in which the numeral is drawn. As shown in the figure, the input data is constituted by n pixels, and the value Ak of each pixel is a digital value of one or multiple bits.

The learning device 2 learns features from many pieces of the input data generated by the sensor 1, to establish a neural network. As described later in detail, the established neural network is represented as weight coefficients used by computation units in the recognition device 3. When the learning device 2 receives input data corresponding to the image in which a numeral "x" is drawn, the learning device 2 finds weight coefficients for outputting that the input data is "x".

By receiving much input data from a user, the accuracy of the neural network can be improved, and the cost for collecting the data can be reduced. In the present embodiment, the learning device 2 establishes the neural network using a known manner.

The recognition device 3 obtains the weight coefficients of the neural network from the learning device 2. When the learning device 2 updates the neural network, the recognition device 3 obtains the weight coefficients of a new neural network, thus improving the accuracy of the recognition.

Then, the recognition device 3 having obtained the weight coefficients receives input data which are the recognition target generated by the sensor 1. Then, the recognition device 3 applies the neural network using the weight coefficient on the input data, and recognizes what the numeral drawn on the image is.

The application 4 performs various kinds of processing using the recognition result.

Once the parameter of the neural network is obtained from the learning device 2, the recognition device 3 thereafter can recognize the input data without referring to the learning device 2 and. The result of the recognition is used by the application 4. For this reason, in the recognition stage, this recognition system can operate with an extremely low consumption power.

Figure 2:
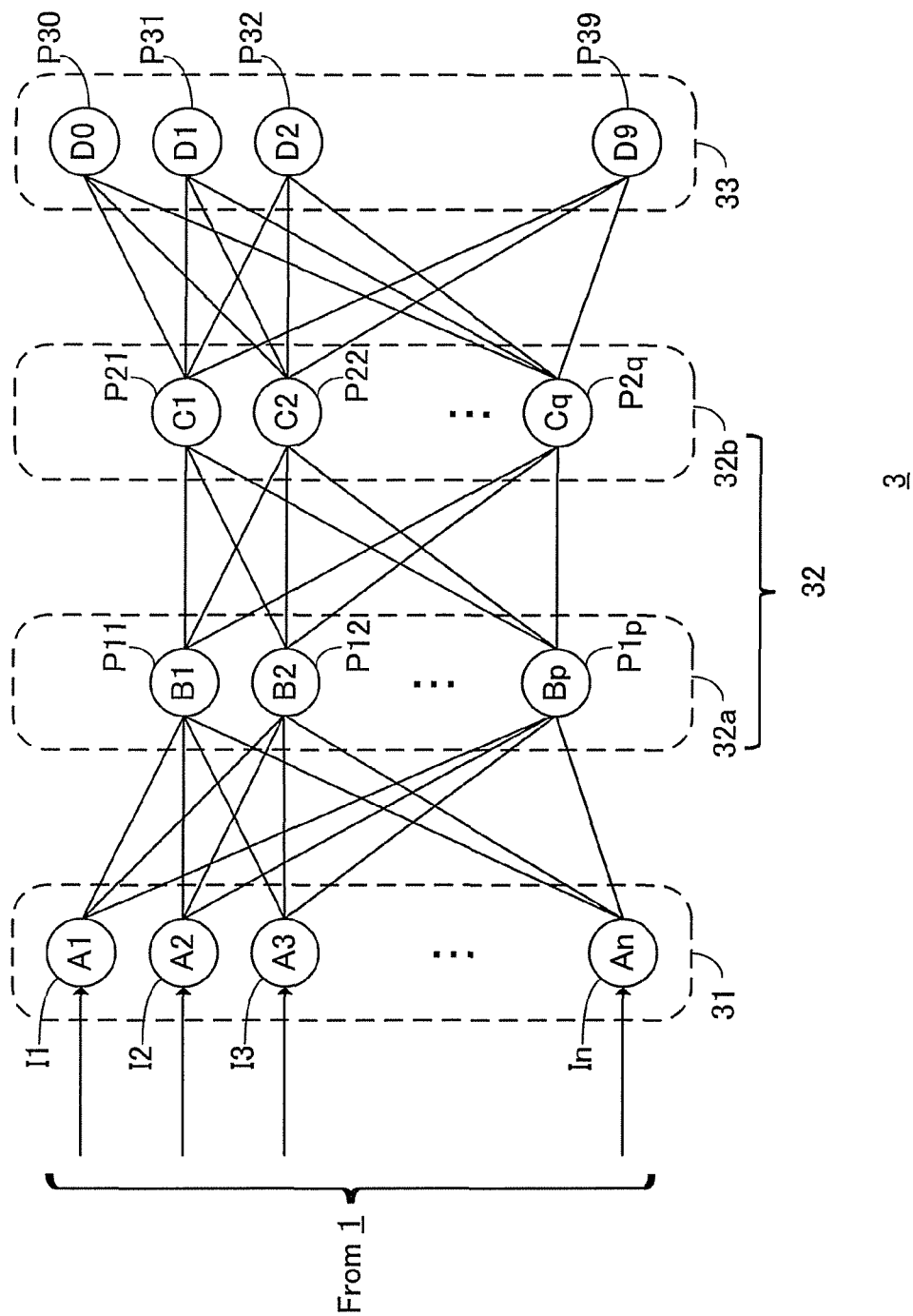
FIG. 2 is a block diagram illustrating a schematic configuration of the recognition device 3.

FIG. 2 is a block diagram illustrating a schematic configuration of the recognition device 3, and illustrates a neural network. The recognition device 3 may be implemented with, for example, one or more integrated circuits. The recognition device 3 includes an input layer 31, one or more hidden layers 32, and an output layer 33. The hidden layer 32 and output layer 33 are also collectively referred to as computation layers. The figure shows an example where the recognition device 3 includes two hidden layers 32a, 32b. In this case, the hidden layer 32a is also referred to as the hidden layer of the first stage. The hidden layer 32b may also be referred to as a hidden layer subsequent to the hidden layer 32a of the previous stage, or as the hidden layer of the final stage.

The input layer 31 includes n input units I1 to In. The number of input units I1 to In is equal to the number of pixels of the input data generated by the sensor 1. The k-th pixel value Ak of the input data is set in the input unit Ik.

The hidden layer 32a includes p (p is any given integer) computation units P11 to P1p. The operation of the computation units P11 to P1p is all the same, and therefore, in the description below, they are described as the computation unit P1k representing them. The computation unit P1k receives n pixel values A1 to An from input units I1 to In of the input layer 31. Then, the computation unit P1k performs predetermined computation processing on the pixel values A1 to An and weight coefficients Fk1 to Fkn corresponding thereto respectively, thus generating a new digital value Bk. The digital value Bk may be one bit or multiple bits. The weight coefficients Fk1 to Fkn are obtained from the learning device 2.

The hidden layer 32b has q (q is any given integer) computation units P21 to P2q. The operation of the computation units P21 to P2p is all the same, and therefore, in the description below, they are described as the computation unit P2k representing them. The computation unit P2k receives p digital values B1 to Bp from the computation units P11 to Pip of the hidden layer 32a of the previous layer. Then, the computation unit P2k performs predetermined computation processing on the digital values B1 to Bp and weight coefficients Gk1 to Gkp corresponding thereto respectively, thus generating a new digital value Ck. The digital value Ck may be one bit or multiple bits. The weight coefficients Gk1 to GKp are obtained from the learning device 2.

The output layer 33 has ten computation units P30 to P39. In the present embodiment, the number of possible recognition results is 10 (more specifically, one-digit numerals 0 to 9), and therefore, the computation units P30 to P39 corresponding thereto are provided. The operation of the computation units P31 to P39 is all the same, and therefore, in the description below, they are described as the computation unit P3k representing them. The computation unit P3k receives q digital values C1 to Cq from the computation units P21 to P2q of the hidden layer 32b. Then, the computation unit P3k performs predetermined computation processing on the digital values C1 to Cq and weight coefficients Hk1 to Hkq corresponding thereto respectively, thus generating a new digital value Dk. The weight coefficients Hk1 to Hkq are obtained from the learning device 2.

Preferably, digital value Dk is one bit, and any one of digital values D0 to D9 is "1". Then, for example, when the digital value D6 is "1", the recognition result is that, in the image, a numeral "6" is drawn.

In this case, the weight coefficients Fk1 to Fkn, Gk1 to Gkp and Hk1 to Hkq are important parameters in the neural network, and by appropriately defining them, the input data can be correctly recognized.

FIG. 2 shows an example where the neural network has two hidden layers, but one or more hidden layer 32 may be additionally provided between the hidden layers 32a and 32b. In general, the larger the number of hidden layers is, the higher the accuracy of the recognition becomes. Especially, defining weight coefficients with regard to many hidden layers is referred to as "deep learning". Alternatively, there may be only one hidden layer. In this case, the hidden layer 32b is not provided, and the output of the hidden layer 32a is input into the output layer 33.

Subsequently, the computation processing of each computation unit will be described. In the neural network, the computation units P11 to Pip of the hidden layer 32a, the computation units P21 to P2q of the hidden layer 32b, and the computation units P30 to P39 of the output layer 33 perform substantially the same computation processing. Therefore, in the description below, they will be denoted as computation unit P.

Figure 3:
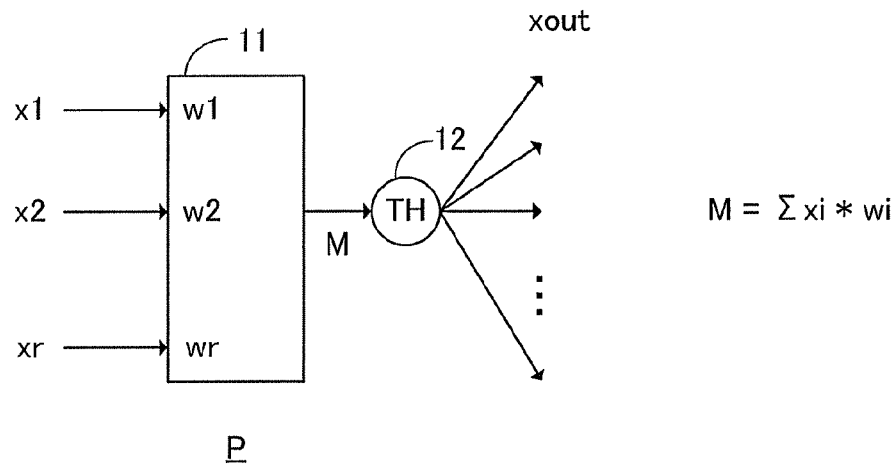
FIG. 3 is a figure for schematically illustrating the computation processing of the computation unit P.

FIG. 3 is a figure for schematically illustrating the computation processing of the computation unit P. The computation unit P includes a production summation computation unit 11 and a threshold value processing unit 12.

The computation unit P receives multiple digital values x1 to xr from the input unit or the computation unit of the previous stage. In this case, the digital values x1 to xr are the pixel values A1 to An (r=n) for the computation units P11 to Pip of the hidden layer 32a of the first stage, are the digital values B1 to Bp (r=p) for the computation units P21 to P2q of the hidden layer 32b of the second stage, and are the digital values C1 to Cq (r=q) for the computation units P30 to P39 of the output layer 33.

In the computation unit P, weight coefficients w1 to wr corresponding to the digital values x1 to xr, respectively, are defined in advance. The weight coefficients w1 to wr are obtained from the learning device 2.

Then, the production summation computation unit 11 generates an intermediate signal M by performing the production summation computation processing as shown below in (1).

$$M=\Sigma wi*xi \quad (1)$$

In this case, $\Sigma$ indicates a summation where i is 1 to r.

Further, the threshold value processing unit 12 performs threshold value processing for comparing the intermediate signal M and a threshold value TH, thus generating a digital value xout. The threshold value TH may be a constant defined in advance, or may be obtained from the learning device 2. The threshold value TH may be the same for all the computation units P, or may be different for each computation unit P.

In this case, the digital values xout are the digital values B1 to Bp for the computation units P11 to P1p, respectively, of the hidden layer 32a of the first stage, are the digital values C1 to Cq for the computation units P21 to P2q, respectively, of the hidden layer 32b of the second stage, and are the digital value D0 to D9 for the computation units P30 to P39, respectively, of the output layer 33.

In the present embodiment, the computation processing of FIG. 3 is performed with hardware. However, since there are many weight coefficients (there may be several billion weight coefficients), the circuit configuration may become complicated and the power consumption may be increased if an ordinary digital circuit is used. Therefore, in the present embodiment, the circuit configuration is simplified by performing computation using a circuit suitable for the production summation computation processing and the threshold value processing described above, thus enhancing the speed of processing and reducing the power consumption. Hereinafter, this will be described in more details.

Figure 4:
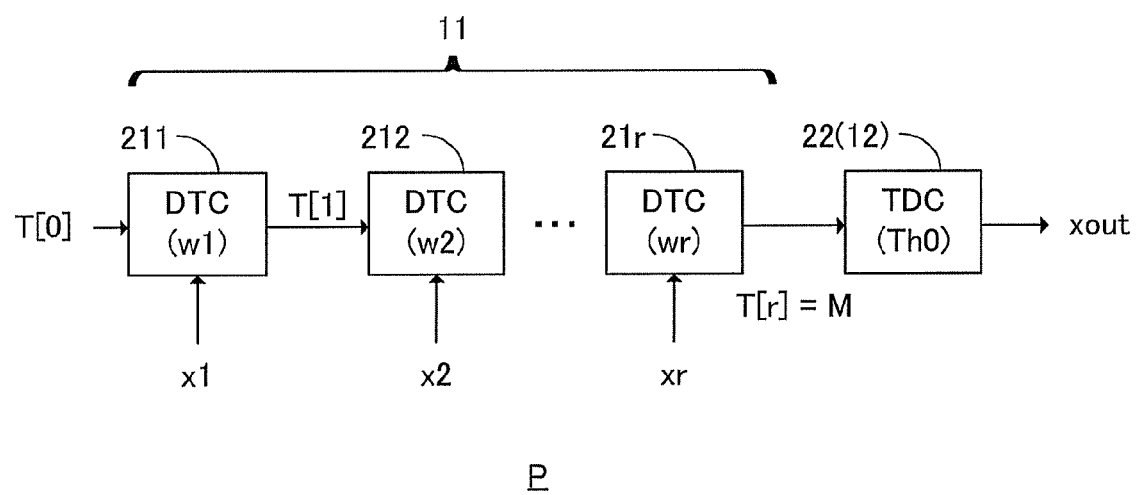
FIG. 4 is a block diagram schematically illustrating hardware configuration of the computation unit P of FIG. 3.

FIG. 4 is a block diagram schematically illustrating hardware configuration of the computation unit P of FIG. 3. The computation unit P includes r digital-to-time conversion circuits (Digital to Time Converter, hereinafter referred to as DTC circuits) 211 to 21r constituting the production summation computation unit 11, and a time-to-digital conversion circuit (Time to Digital Converter, hereinafter referred to as a TDC circuit) 22 constituting the threshold value processing unit 12.

The r DTC circuits 211 to 21r are connected in series. A reference time signal T[0] is input into the DTC circuit 211 of the first stage. The reference time signal T[0] is a signal whose voltage value changes at a reference time. Each DTC circuit 21k (k=1 to r) generates a time signal T[k]. The time signal T[k] is input into the DTC circuit 21(k+1) of the subsequent stage. A time signal T[r] generated by the DTC circuit 21r of the final stage is an intermediate signal M. Hereinafter, the time signal T[k] will be described.

Figure 5:
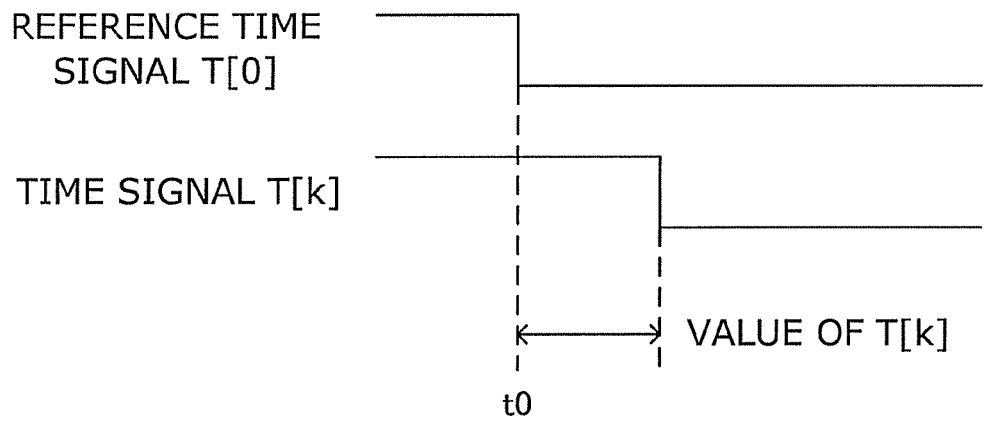
FIG. 5 is a figure for illustrating the time signal T[k].

FIG. 5 is a figure for illustrating the time signal T[k]. The horizontal direction represents elapse of time, and the vertical direction represents a voltage value. As shown in the figure, the time signal T[k] is a signal whose voltage value changes at a certain time. The difference between a predetermined reference time t0 and the time when the voltage value of the time signal T[k] changes corresponds to the value of the time signal T[k]. Alternatively, the time signal T[k] can be said to be a signal obtained by delaying the reference time signal whose voltage value changes at the time t0 by the time corresponding to the value of the time signal T[k]. The transition of the voltage value may be transition from "0" to "1" as shown in the figure or from "1" to "0".

Referring to FIG. 4 again, a digital value xk and a weight coefficient wk are set on the DTC circuit 21k. The DTC circuit 21k delays a time signal T[k−1], which is input from the DTC circuit 21(k−1) of the previous stage, by the time corresponding to the weight coefficient wr and the digital value xr, thus generating the time signal T[k]. More specifically, the DCT circuit 21k generates the time signal T[k] as shown in the expression (2) below.

$$T[k]=T[k-1]+wi*xi \quad (2)$$

As a result, the DTC circuit 21r of the final stage generates the intermediate signal M as shown in the expression (3) below.

$$M=T[r]=T[0]+\Sigma wi*xi \quad (3)$$

The above expression (3) corresponds to the expression (1). As described above, in the present embodiment, the intermediate signal M is the time signal, so that the hardware configuration can be simplified. In the description below, an example of the circuit configuration of the DTC circuit 21k and the threshold value circuit 22 will be described.

Figure 6:
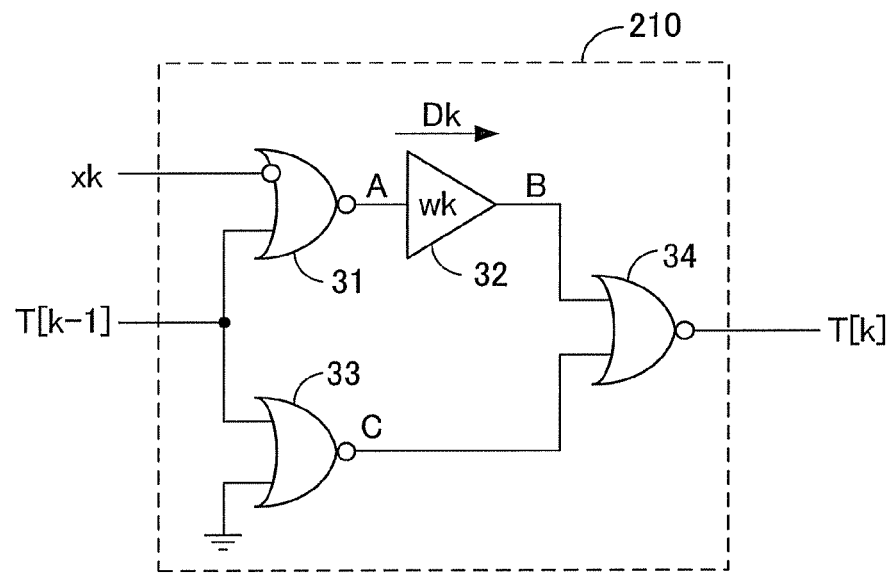
FIG. 6 is a figure illustrating an example of a circuit configuration of the DTC circuit 21k.

FIG. 6 is a figure illustrating an example of a circuit configuration of the DTC circuit 21k. The DTC circuit 21k is an example where the digital value xk is one bit, and is constituted by a unit DTC circuit 210. As shown in the figure, the unit DTC circuit 210 includes an NOR circuit 31, a delay circuit 32, and NOR circuits 33 and 34.

The NOR circuit 31 generates a signal A by NOR operation of the time signal T[k] and inversion of the digital value xk. The delay circuit 32 generates a signal B by delaying the signal A by the time Dk corresponding to the weight coefficient wk. In the NOR circuit 33, one of the inputs is fixed at "0", and therefore, a signal C is generated by inversing the time signal T[k−1]. The NOR circuit 34 generates the time signal T[k] by NOR operation of the signal B and the signal C.

A specific configuration example of the delay circuit 32 will be described in the second embodiment.

Figures 7A, 7B:
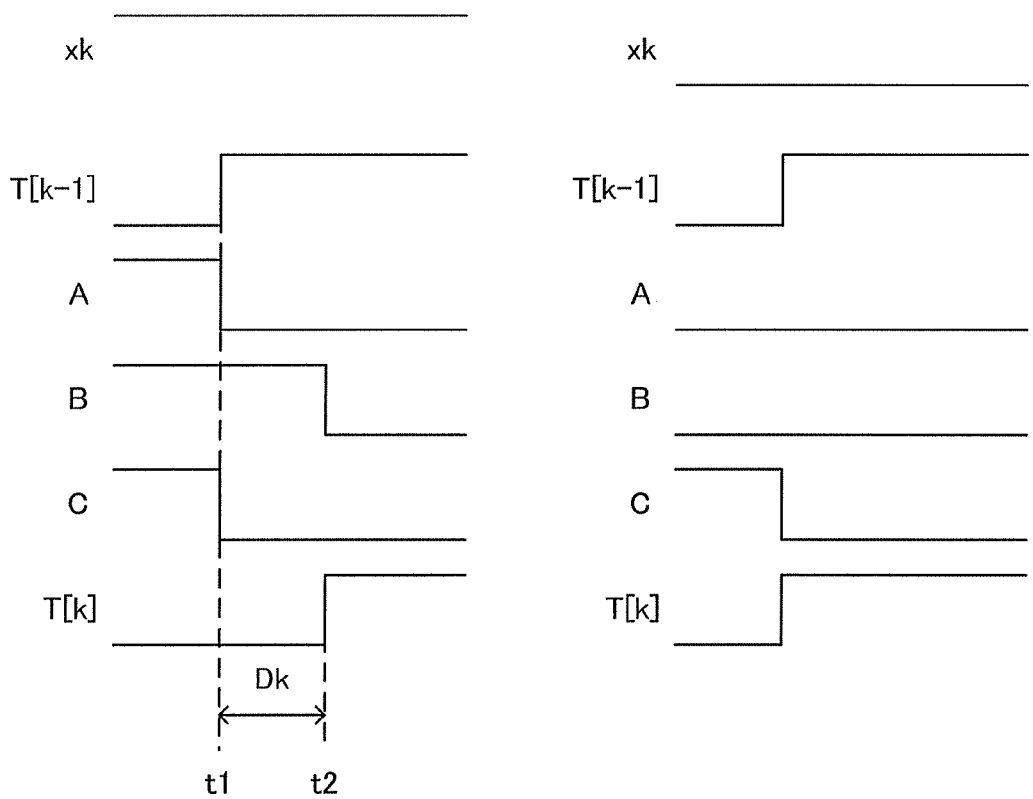
FIGS. 7A and 7B are time charts for illustrating operation of the DTC circuit 21k of FIG. 6.

FIGS. 7A and 7B are time charts for illustrating operation of the DTC circuit 21k of FIG. 6, and show the waveforms of the digital value xk, the time signal T[k−1], the signals A to C, and the time signal T[k]. In this case, the time signal T[k−1] is considered to change from "0" to "1" at the time t1. FIG. 7A is a time chart in a case where the digital signal xk is "0". FIG. 7B is a time chart in a case where the digital signal xk is "1". In the description below, unless otherwise specified, the delay time of the NOR circuits 31, 33, and 34 is sufficiently smaller than the delay time of the delay circuit 32, and is therefore, disregarded.

As shown in FIG. 7A, when the digital value xk is "1", the time signal T[k] is a signal that changes from "0" to "1" at the time t2 when the time Dk corresponding to the weight coefficient wk has elapsed since the time t1, i.e., a signal that is obtained by delaying the time signal T[k−1] by Dk.

On the other hand, as shown in FIG. 7B, when the digital value xk is "0", the time signal T[k] is a signal that changes from "0" to "1" at the time t1, i.e., the time signal T[k−1] itself.

Figure 8:
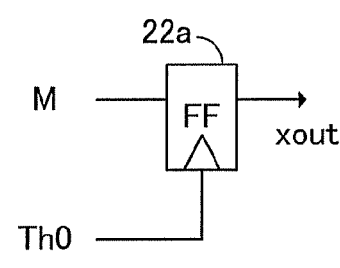
FIG. 8 is a figure illustrating an example of a circuit configuration of the TDC circuit 22.

FIG. 8 is a figure illustrating an example of a circuit configuration of the TDC circuit 22. The TDC circuit 22 is also a circuit example where the digital value xout is one bit. As shown in the figure, the TDC circuit 22 is constituted by one flip-flop 22a. The TDC circuit 22 compares the intermediate signal M and a time threshold value signal Th0, to generate a digital value xout of one bit.

Figure 9A:
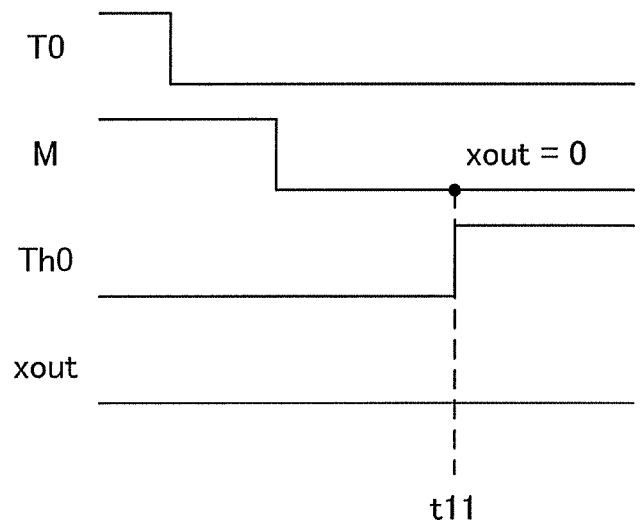
FIGS. 9A and 9B are a time charts for illustrating operation of the TDC circuit 22 of FIG. 8.
Figure 9B:
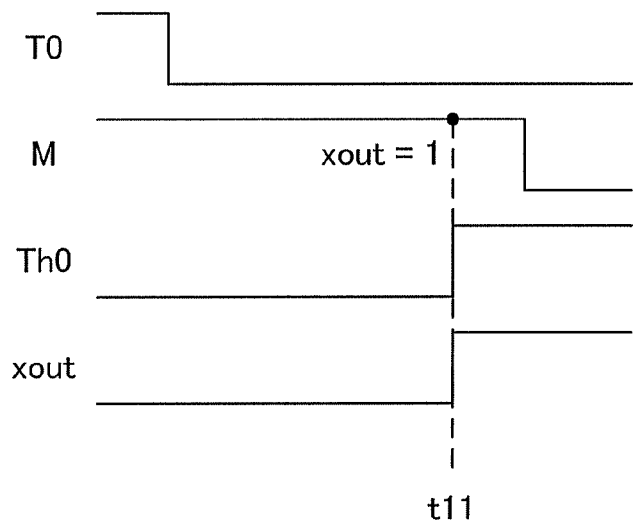

FIG. 9 is a time chart for illustrating operation of the TDC circuit 22 of FIG. 8. FIGS. 9A and 9B show an intermediate signal M0, the time threshold value signal Th0, and the digital signal xout, and also shows a reference time signal T0 for reference.

The time threshold value signal Th0 is a signal whose logic changes from "0" to "1" at the time t11 corresponding to the threshold value. The flip-flop 22a retrieves the value of the intermediate signal M at the time when the time threshold value signal Th0 changes, and makes the retrieved value to be the digital signal xout.

More specifically, in the case of FIG. 9A, the intermediate signal M has a smaller delay time with respect to the reference signal T0, and changes from "1" to "0" before the time t11. Therefore, the flip-flop 22a sets the digital value xout to "0". On the other hand, in the case of FIG. 9B, the intermediate signal M has a larger delay time with respect to the reference signal T0, and changes from "1" to "0" after the time t11. Therefore, the flip-flop 22a sets the digital value xout to "1".

Figure 10:
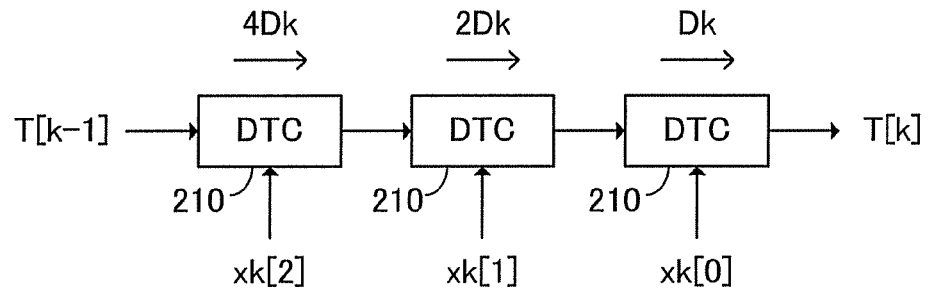
FIG. 10 is a figure illustrating another example of a circuit configuration of the DTC circuit 21k.

FIG. 10 is a figure illustrating another example of a circuit configuration of the DTC circuit 21k. The DTC 21k is a circuit example where the digital value xk is composed of three bits, and in which three unit DTC circuits 210 as shown in FIG. 6 are connected in series. In general, when the digital value xk is composed of n bits, n unit DTC circuits 210 need to be connected in series.

The unit DTC circuit 210 of the first stage receives the most significant bit xk[2] of the digital value xk and the time signal T[k−1] from the DTC circuit 21(k−1) of the previous stage. The delay time of the delay circuit 32 in the unit DTC circuit 210 of the first stage is four times the time Dk corresponding to the weight coefficient wk.

The unit DTC circuit 210 of the second stage receives the second bit xk[1] from the highest bit of the digital value xk and the time signal from the unit DTC circuit 210 of the first stage. The delay time of the delay circuit 32 in the unit DTC circuit 210 of the second stage is twice the time Dk corresponding to the weight coefficient wk.

The unit DTC circuit 210 of the final stage receives the least significant bit xk[0] of the digital value xk and the time signal from the unit DTC circuit 210 of the second stage. The delay time of the delay circuit 32 in the unit DTC circuit 210 of the final stage equals to the time Dk corresponding to the weight coefficient wk.

Figure 11:
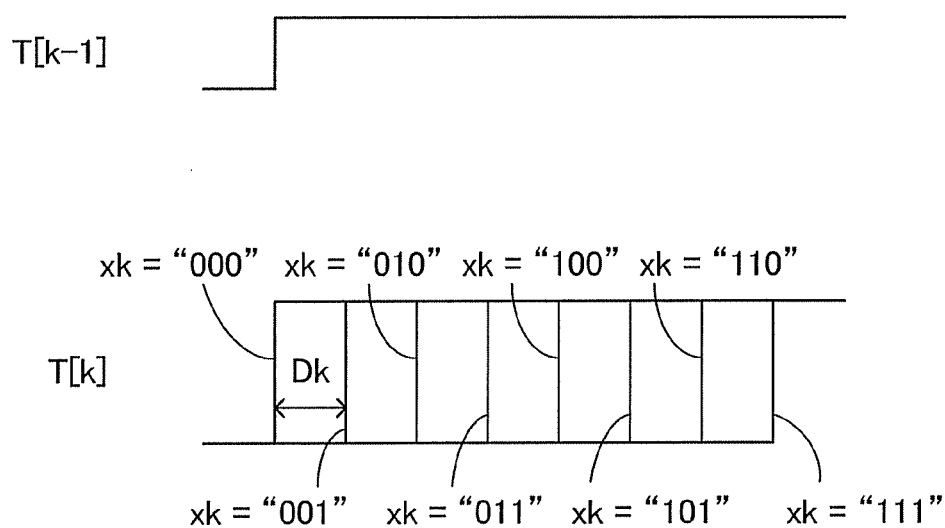
FIG. 11 is a time chart for illustrating operation of the DTC circuit 21k of FIG. 10.

FIG. 11 is a time chart for illustrating operation of the DTC circuit 21k of FIG. 10. As shown in the figure, the DTC circuit 21k outputs the time signal T[k] by delaying the received time signal T[k−1] in accordance with the digital value xk. When the digital value xk increases by one, the delay time increases by the time Dk corresponding to the weight coefficient wk.

Figure 12:
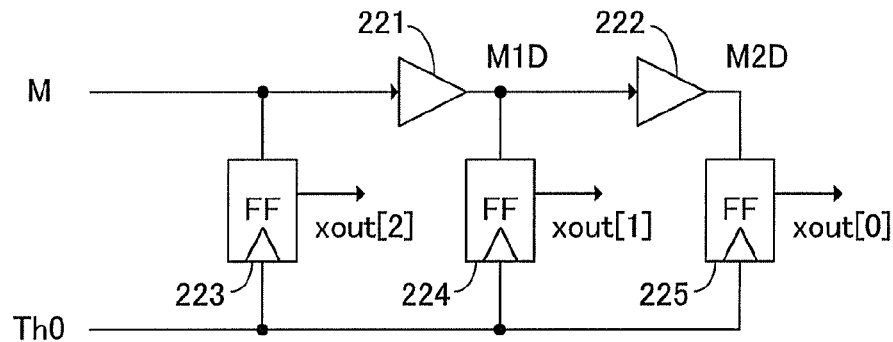
FIG. 12 is a figure illustrating another example of a circuit configuration of the TDC circuit 22.

FIG. 12 is a figure illustrating another example of a circuit configuration of the TDC circuit 22. The TDC circuit 22 shows an example where a digital value xout composed of three bits is generated. The TDC circuit 22 includes two delay devices 221 and 222 and three flip-flops 223 to 225.

The delay device 221 generates a signal M1D by delaying the intermediate signal M by a predetermined time. The delay device 222 generates a signal M2D by delaying the signal M1D by a predetermined time. The flip-flops 223 to 225 receive the intermediate signal M, the signals M1D and M2D, respectively. The flip-flops 223 compares the intermediate signal M with the time threshold value signal Th0 to generate a digital values xout[2]. Similarly, the flip-flops 224 compares the signal M1D with the time threshold value signal Th0 to generate a digital values xout[1]. Finally, the flip-flops 225 compares the signal M2D with the time threshold value signal Th0 to generate a digital values xout[0].

Figure 13:
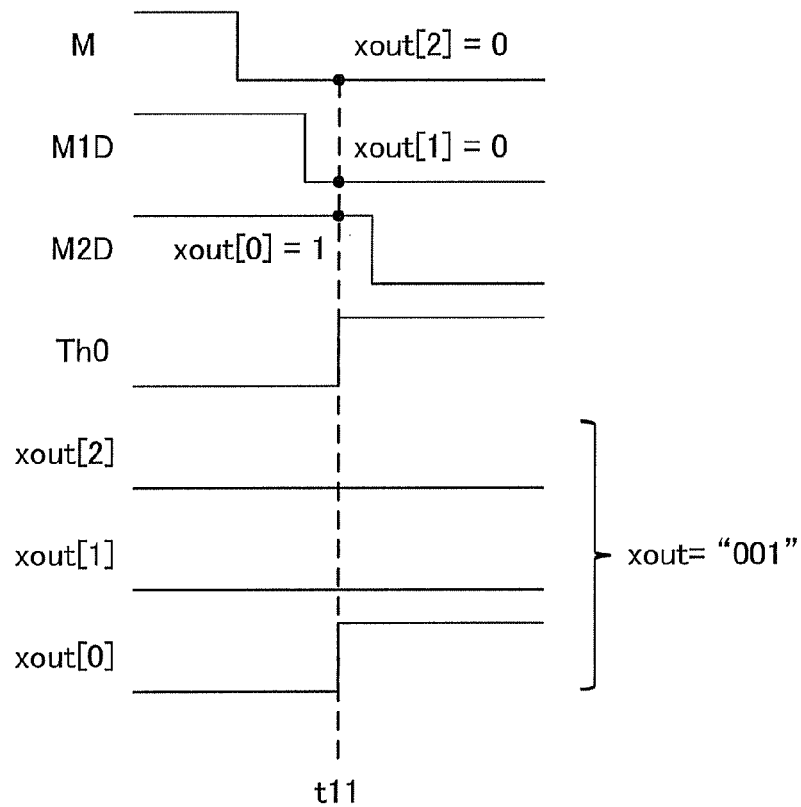
FIG. 13 is a time chart for illustrating operation of the TDC circuit 22 of FIG. 12.

FIG. 13 is a time chart for illustrating operation of the TDC circuit 22 of FIG. 12. FIG. 13 shows the intermediate signal M, the signals M1D and M2D, the time threshold value signal Th0, and the signals xout[2], xout[1], and xout[0].

The time threshold value signal Th0 is a signal whose logic changes from "0" to "1" at the time t11 corresponding to the threshold value. The flip-flops 223 to 225 retrieve the values of the intermediate signal. M, the signals M1D and M2D at the time when the time threshold value signal Th0 changes, and makes the retrieved values to be the signals xout[2], xout[1], and xout[0], respectively.

More specifically, in the case of FIG. 13, the intermediate signal M and the signal M1D change from "1" to "0" before the time t11. On the other hand, the signal M2D obtained by delaying the signal M1D changes from "1" to "0" after the time tn. Therefore, the flip-flops 223 to 225 sets the signals xout[2], xout[1], and xout[0] to "0", "0", and "1", respectively. As a result, the digital signal xout becomes "001".

Figure 14:
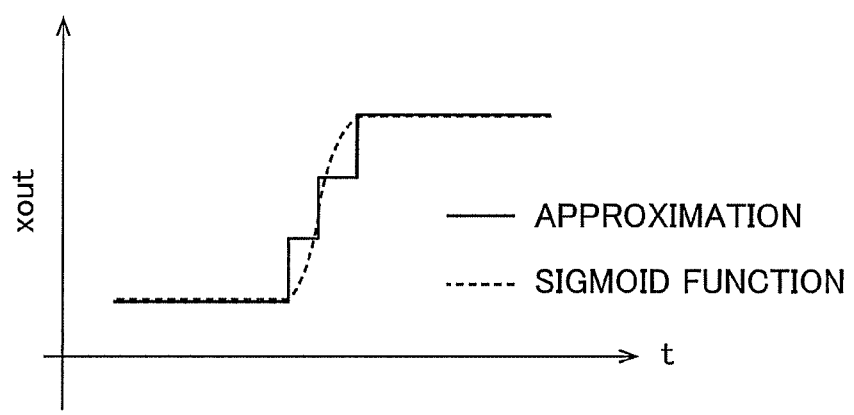
FIG. 14 is a diagram showing a sigmoid function.

As shown in FIGS. 12 and 13, sigmoid function $1/(1+e^x)$ as shown in FIG. 14 may be approximated by determining the delay time of the intermediate signal M, which is the time signal, in details.

With the DTC circuit 21r and the TDC circuit 22 described above, each computation unit P can perform the computation as shown in FIG. 3.

As described above, in the first embodiment, using the time signal representing information by a time when the voltage value changes, computation processing required for recognition with the neural network is performed. Therefore, the hardware configuration can be simplified.

Second Embodiment

In the second embodiment, several circuit examples of a delay circuit 32 in the DTC circuit of FIG. 6 will be shown.

Figure 15:
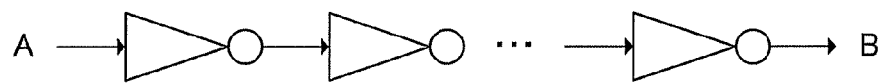
FIG. 15 is a circuit diagram illustrating a first example of the delay circuit 32.

FIG. 15 is a circuit diagram illustrating a first example of the delay circuit 32. As shown in the figure, the delay circuit 32 has multiple inverters (delay devices) that are connected in series. Each inverter delays a received signal by a predetermined time and provides it to the inverter of the subsequent stage. The more inverters are provided, the longer the delay time can be. Therefore, the delay circuit 32 can be structured in a simple manner. In the case of the delay circuit of FIG. 15, the delay time is a fixed value that is determined according to the number of the inverters, and is difficult to be changed after a recognition device 3 is manufactured.

Figure 16A:
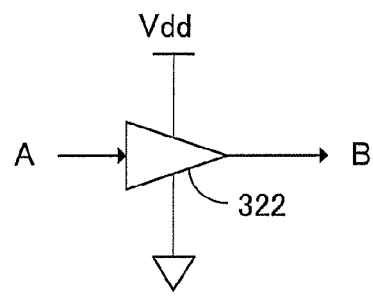
FIGS. 16A and 16B are figures for illustrating a second example of a delay circuit 32'.
Figure 16B:
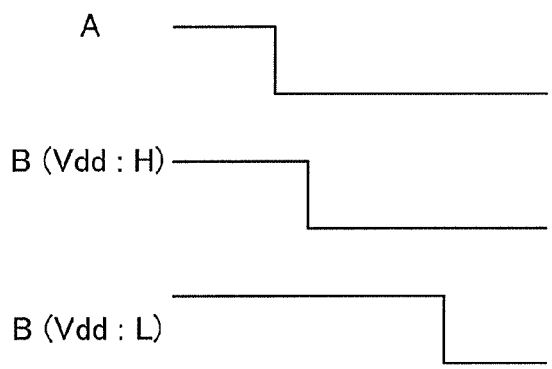

FIGS. 16A and 16B are figures for illustrating a second example of a delay circuit 32'. FIG. 16A is a circuit diagram. FIG. 16B is a time chart schematically illustrating operation thereof.

As illustrated in FIG. 16A, the delay circuit 32' has a delay device 322 receiving a variable power supply voltage Vdd. For example, as illustrated in FIG. 15, the delay device 322 may include multiple inverters, and at least one of them may receive the variable power supply voltage Vdd.

As shown in FIG. 16B, the delay device 322 generates a signal B by delaying a signal A in accordance with the received power supply voltage Vdd. For example, when the power supply voltage Vdd is high (Vdd: H), the delay time is reduced. On the other hand, when the power supply voltage Vdd is low (Vdd: L), the delay time becomes long.

Figure 17A:
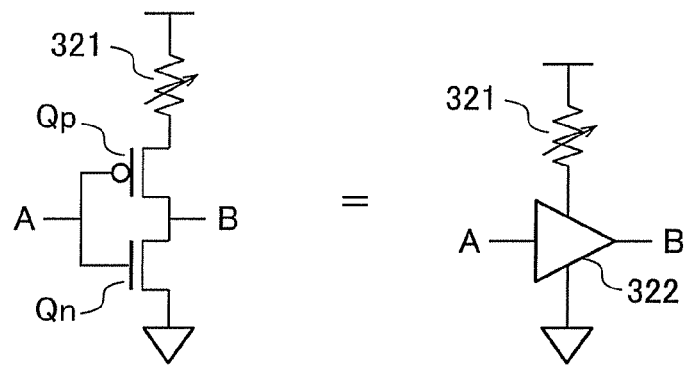
FIGS. 17A to 17C are circuit diagrams illustrating a third example of a delay circuit 32".
Figure 17B:
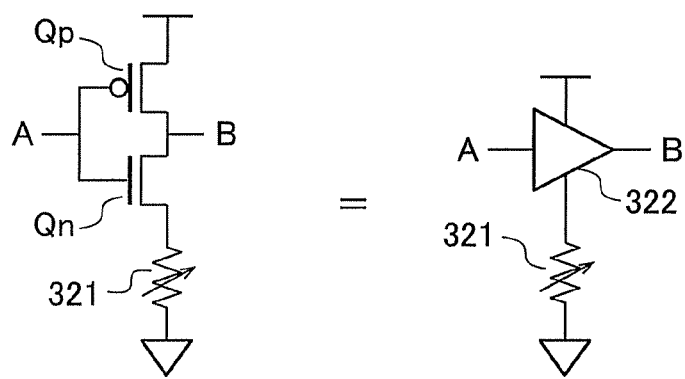
Figure 17C:
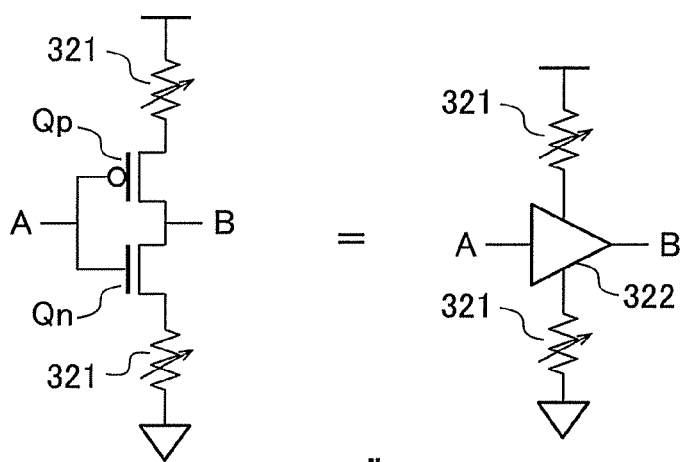

FIGS. 17A to 17C are circuit diagrams illustrating a third example of a delay circuit 32". As shown in the figure, the delay circuit 32" includes a variable resistance device 321, a pMOS transistor Qp, and an nMOS transistor Qn. The transistors Qp and Qn constitute a delay device 322. As shown in FIG. 17A, a variable resistance device 321 may be inserted between a power supply terminal and a source terminal of the transistor Qp. Alternatively, as shown in FIG. 17B, the variable resistance device 321 may be inserted between a ground terminal and a source terminal of the transistor Qn. Still alternatively, as shown in FIG. 17C, the variable resistance devices 321 may be inserted between the power supply terminal and the source terminal of the transistor Qp and between the ground terminal the source terminal of the transistor Qn.

In the delay circuit 32" of FIGS. 17A to 17C, the larger the resistance value of the variable resistance device 321 is, the longer the delay time is.

In order to adjust the polarity of the signal B, one or more inverters may be provided before and after the delay circuit 32" of FIG. 17.

Figure 18:
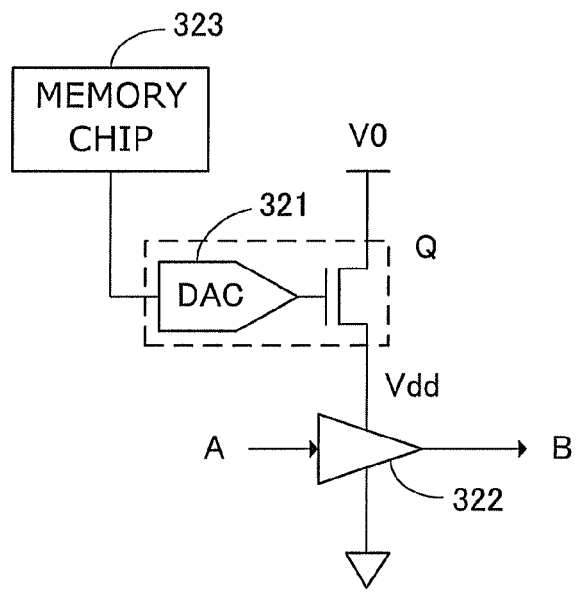
FIG. 18 is a figure illustrating an example of the variable resistance device 321 of FIG. 17A in details.

FIG. 18 is a figure illustrating an example of the variable resistance device 321 of FIG. 17A in details. As shown in the figure, the variable resistance device 321 includes a DA converter (DAC) and an MOS transistor Q. For example, the DAC receives a weight coefficient from a memory chip 323 different from the recognition device 3. This memory chip 323 stores the weight coefficient obtained from a learning device 2 in advance.

The, the DAC converts the weight coefficient into an analog voltage, and inputs it into the gate of the transistor Q. The resistance value of the transistor Q depends on the analog voltage. More specifically, the larger the analog voltage is, the smaller the resistance value is.

With such configuration of FIG. 18, even after the recognition device 3 is manufactured, the resistance value of the variable resistance device 321 can be changed by rewriting the weight coefficient of the memory chip 323. Therefore, the neural network can be flexibly changed. For example, this can support update of the neural network and the change of the purpose of use (e.g., changing from the neural network for recognizing numerals to the neural network for recognizing hiraganas (Japanese characters)).

Figure 19:
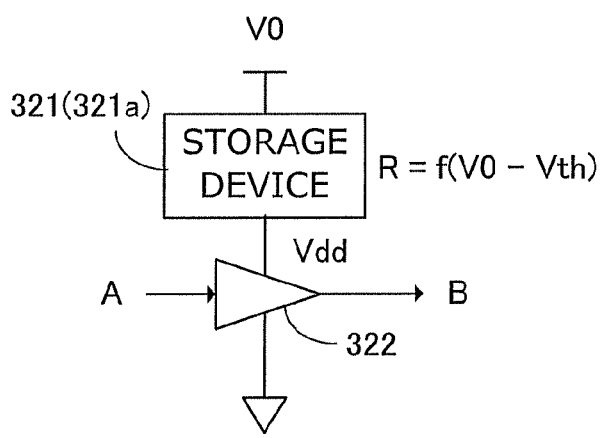
FIG. 19 is a figure illustrating another example of the variable resistance device 321 of FIG. 17A in details.

FIG. 19 is a figure illustrating another example of the variable resistance device 321 of FIG. 17A in details. As shown in the figure, the variable resistance device 321 is constituted by a resistance-variable non-volatile storage device 321a. The storage device 321a may be a NAND-type flash memory, a ReRAM, and the like, but is not particularly limited.

The storage device 321a stores a weight coefficient of the neural network. The storage device 321a has a threshold value voltage Vth according to the weight coefficient. A resistance value R of the storage device 321a is represented by R=f(V0−Vth) according to the threshold value Vth.

More specifically, the storage device 321a has not only a function serving as the variable resistance device but also a function serving as a memory for storing the weight coefficient.

With the configuration of FIG. 19, even after the recognition device 3 is manufactured, the resistance value of the variable resistance device 321 can be changed by readjusting the threshold value voltage Vth of the storage device 321a. Further, the storage device 321a itself can store the weight coefficient. Therefore, as compared with FIG. 18, it is not necessary to provide the memory chip 323, and the time for loading the weight coefficient from the memory chip 323 can be saved.

It should be noted that FIGS. 18 and 19 may be applied to the variable resistance device 321 in FIGS. 17B and 17C.

Figure 20:
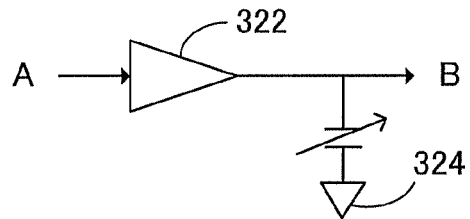
FIG. 20 is a circuit diagram illustrating a fourth example of a delay circuit 32'''.

FIG. 20 is a circuit diagram illustrating a fourth example of a delay circuit 32'''. As shown in the figure, the delay circuit 32''' includes a variable capacitance 324 between the output terminal of the delay device 322 and the ground terminal. The larger the capacitance value of the variable capacitance 324 is, the longer the delay time is.

Figure 21:
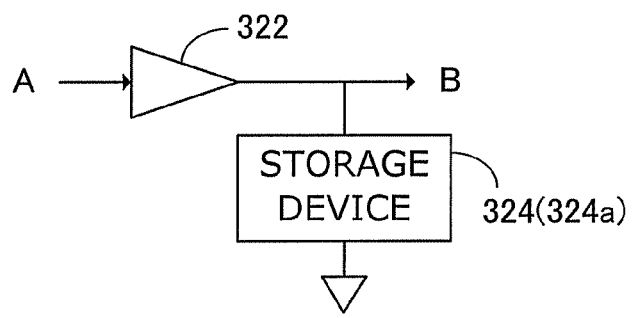
FIG. 21 is a figure illustrating the variable capacitance 324 of FIG. 17 in details.

FIG. 21 is a figure illustrating the variable capacitance 324 of FIG. 17 in details. As shown in the figure, a capacitance-change-type non-volatile storage device 324a may be used as the variable capacitance. Similar to FIG. 19, the storage device 324a has not only a function serving as the variable capacitance device but also a function serving as a memory for storing the weight coefficient.

The delay circuit 32 as described above is an analog circuit, and therefore, an exactly desired delay time is not always attained. However, the neural network itself is a fault tolerant system, and therefore this issue hardly causes any problem.

In each embodiment described above, an example for recognizing the numeral drawn in the image is shown. However, the purpose of each embodiment is not limited, and the image other than the numeral may be recognized. Other than the image, sound may be recognized. In this case, the sensor 1 may convert the sound into input data. Alternatively, the present invention may be applied to activity prediction of a chemical compound.

The "recognition" in the description above is a concept including not only "recognition", which is to find what the numeral is, but also "classification" and "prediction". All the computation devices as shown in FIG. 2 are preferably of the configuration described in the embodiment, but may be of a configuration at least a portion of which is different.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

The invention claimed is:

1. A processing device configured to process input data formed of a plurality of input digital values, the processing device comprising:
   a plurality of computation layers connected in series, each of the computation layers comprising a plurality of computation devices, wherein
   each of the plurality of computation devices in the computation layer of a first stage is configured to generate a digital value from the input digital values and weight coefficients defined in advance, the weight coefficients being applied to each of the input digital values,
   each of the plurality of computation devices of the computation layer of a second or subsequent stage is configured to generate a new digital value from the digital values generated by the computation devices of the computation layer of the previous stage and weight coefficients defined in advance, the weight coefficients being applied each of the digital values,
   the digital values generated by the computation devices of the computation layer of a final stage indicate an processing result, and
   at least one of the computation devices comprises:
   a plurality of digital-to-time conversion circuits connected in series, each of the plurality of digital-to-time conversion circuits generating a second time signal by delaying a first time signal by a time corresponding to an inputted digital value and the weight coefficient corresponding to the digital value, and the second time signal being inputted into the digital-to-time conversion circuit of a subsequent stage as the first time signal; and a time-to-digital conversion circuit configured to generate a digital signal by comparing the second time signal outputted from the digital-to-time conversion circuit of the final stage and a first time threshold signal.

2. The processing device of claim 1, wherein the digital-to-time conversion circuit comprises a delay circuit configured to delay a signal by a time corresponding to the weight coefficient.

3. The processing device of claim 2, wherein the delay circuit comprises a plurality of delay devices connected in series.

4. The processing device of claim 2, wherein the delay circuit comprises a delay device configured to delay an input signal by a time corresponding to a provided power supply voltage.

5. The processing device of claim 2, wherein the delay circuit comprises:
   a variable resistance device; and
   a delay device configured to delay an input signal by a time corresponding to a resistance value of the variable resistance device.

6. The processing device of claim 5, wherein
   the delay device comprises a pMOS transistor and nMOS transistor, and
   the variable resistance device is inserted at least one of between a source terminal of the pMOS transistor and a power supply voltage and between the source terminal of the nMOS transistor and a ground.

7. The processing device of claim 5, wherein the variable resistance device comprises:
   a DA converter configured to convert the weight coefficient which is a digital value into an analog voltage; and
   a transistor, the analog voltage being inputted to a control terminal of the transistor, and the resistance value of the transistor varying depending on a value of the analog voltage.

8. The processing device of claim 5, wherein the variable resistance device is a resistance-variable-type non-volatile storage device storing the weight coefficient.

9. The processing device of claim 8, wherein the resistance-variable-type non-volatile storage device has a threshold voltage depending on the weight coefficient, and the resistance value varies depending on the threshold voltage.

10. The processing device of claim 2, wherein the delay circuit comprises:
    a variable capacitance; and
    a delay device configured to delay an input signal by a time corresponding to a capacitance value of the variable capacitance device.

11. The processing device of claim 10, wherein the variable capacitance is a capacitance-change-type non-volatile storage device.

12. The processing device of claim 1, wherein the weight coefficient is rewritable.

13. A processing device configured to process input data by a neural network using a plurality of computation devices, wherein at least one of the computation devices comprises:
    a plurality of digital-to-time conversion circuits connected in series, each of the plurality of digital-to-time conversion circuits generating a second time signal by delaying a first time signal by a time corresponding to an inputted digital value and a weight coefficient applied to the digital value, and the second time signal being inputted into the digital-to-time conversion circuit of a subsequent stage as the first time signal; and
    a time-to-digital conversion circuit configured to generate a digital signal by comparing the second time signal outputted from the digital-to-time conversion circuit of the final stage and a first time threshold signal.

14. The processing device of claim 13, wherein the digital-to-time conversion circuit comprises a delay circuit configured to delay a signal by a time corresponding to the weight coefficient.

15. The processing device of claim 14, wherein the delay circuit comprises a plurality of delay devices connected in series.

16. The processing device of claim 14, wherein the delay circuit comprises a delay device configured to delay an input signal by a time corresponding to a provided power supply voltage.

17. The processing device of claim 14, wherein the delay circuit comprises:
    a variable resistance device; and
    a delay device configured to delay an input signal by a time corresponding to a resistance value of the variable resistance device.

18. The processing device of claim 14, wherein the delay circuit comprises:
    a variable capacitance; and
    a delay device configured to delay an input signal by a time corresponding to a capacitance value of the variable capacitance device.

19. The processing device of claim 13, wherein the weight coefficient is rewritable.

20. A computation device used for a processing device configured to process input data by a neural network, the computation device comprising:
    a plurality of digital-to-time conversion circuits connected in series, each of the plurality of digital-to-time conversion circuits generating a second time signal by delaying a first time signal by a time corresponding to an inputted digital value and a weight coefficient applied to the digital value, and the second time signal being inputted into the digital-to-time conversion circuit of a subsequent stage as the first time signal; and
    a time-to-digital conversion circuit configured to generate a digital signal by comparing the second time signal outputted from the digital-to-time conversion circuit of the final stage and a first time threshold signal.

* * * * *